United States Patent
Hellåker (10) Patent No.: US 7,809,367 B2
(45) Date of Patent: Oct. 5, 2010

(54) SYSTEM AND METHOD FOR PRIORITIZED COMMUNICATION BETWEEN A CENTRAL STATION AND REMOTE OBJECTS

(75) Inventor: Jan Hellåker, Västra Frölunda (SE)

(73) Assignee: Volvo Teknisk Utveckling AB (SE)

( * ) Notice: Subject to any disclaimer, the term of this patent is extended or adjusted under 35 U.S.C. 154(b) by 130 days.

(21) Appl. No.: 10/064,286

(22) Filed: Jun. 28, 2002

(65) Prior Publication Data

US 2002/0197988 A1    Dec. 26, 2002

Related U.S. Application Data

(63) Continuation of application No. PCT/SE00/02636, filed on Dec. 21, 2000.

(30) Foreign Application Priority Data

Dec. 29, 1999 (SE) .................................. 9904845

(51) Int. Cl.
*H04W 24/00* (2009.01)

(52) U.S. Cl. ................. 455/423; 455/404.1; 455/414.1; 455/418; 455/424; 455/425; 370/310.2; 370/328

(58) Field of Classification Search ............. 455/414.1, 455/414.3, 521, 404.1, 569.2, 456.2, 418, 455/423, 424, 425; 340/988, 438; 701/29; 370/310.2, 328
See application file for complete search history.

(56) References Cited

U.S. PATENT DOCUMENTS

| | | | |
|---|---|---|---|
| 4,399,330 A | | 8/1983 | Kuenzel |
| 4,734,928 A | | 3/1988 | Weiner |
| 5,115,233 A | * | 5/1992 | Zdunek et al. ............. 370/348 |
| 5,515,043 A | * | 5/1996 | Berard et al. ............. 340/988 |
| 5,568,390 A | * | 10/1996 | Hirota et al. ............. 701/201 |
| 5,572,204 A | * | 11/1996 | Timm et al. ............. 340/988 |
| 5,686,910 A | | 11/1997 | Timm et al. |

(Continued)

FOREIGN PATENT DOCUMENTS

EP        0750406 A2    12/1996

(Continued)

OTHER PUBLICATIONS

European Search Report; EP08011829.2; Nov. 18, 2008.

*Primary Examiner*—Stephen M D'Agosta
(74) *Attorney, Agent, or Firm*—Novak Druce + Quigg LLP (57) ABSTRACT

A management, communication and control system including a customer service center 10 with an operator 11. At least one vehicle 20, at least one boat or ship 24, as well as one or more stationary pieces of equipment 25 such as a remote facility or plant that communicates with the service center 10 via a cellular communication network 30 like GSM (European standard) or AMPS (US standard) and/or a satellite communication network 31, either of which is for exchanging information, data and voice communication in both directions. A position of the vehicle(s) 20 is detected by means of a global positioning system (GPS) 40. Emergency assistance vehicles 22 and roadside assistance vehicles 23 can communicate with the service center 10 in a similar manner or in any other way, and are activated by the service center in case of need by one of the remote objects and/or vehicles.

17 Claims, 4 Drawing Sheets

U.S. PATENT DOCUMENTS

| | | | |
|---|---|---|---|
| 5,687,215 A | 11/1997 | Timm et al. | |
| 5,781,101 A | 7/1998 | Stephen et al. | |
| 5,890,061 A | 3/1999 | Timm et al. | |
| 5,933,080 A * | 8/1999 | Nojima | 340/426.19 |
| 5,953,650 A | 9/1999 | Villevieille | |
| 5,953,677 A * | 9/1999 | Sato | 455/574 |
| 6,028,537 A * | 2/2000 | Suman et al. | 340/988 |
| 6,128,482 A * | 10/2000 | Nixon et al. | 455/414.1 |
| 6,246,672 B1 * | 6/2001 | Lumelsky | 370/310 |
| 6,252,544 B1 * | 6/2001 | Hoffberg | 342/357.1 |
| 6,285,931 B1 * | 9/2001 | Hattori et al. | 701/29 |
| 6,362,730 B2 * | 3/2002 | Razavi et al. | 340/438 |
| 6,388,579 B1 * | 5/2002 | Adcox et al. | 340/902 |
| 6,415,210 B2 * | 7/2002 | Hozuka et al. | 701/29 |
| 6,552,682 B1 * | 4/2003 | Fan | 342/357.09 |
| 6,556,824 B1 * | 4/2003 | Purnadi et al. | 455/442 |
| 6,580,904 B2 * | 6/2003 | Cox et al. | 455/456.2 |
| 6,600,914 B2 * | 7/2003 | Uhlik et al. | 455/404.1 |

FOREIGN PATENT DOCUMENTS

| | | |
|---|---|---|
| JP | 08287386 | 11/1996 |
| JP | 10243438 | 9/1998 |
| JP | 11250383 | 9/1999 |
| JP | 11283158 | 10/1999 |
| JP | 2001550983 | 7/2009 |
| WO | 1992019078 | 10/1992 |
| WO | WO 9500860 A1 | 1/1995 |
| WO | WO 9923809 A1 | 5/1999 |

* cited by examiner

SYSTEM AND METHOD FOR PRIORITIZED COMMUNICATION BETWEEN A CENTRAL STATION AND REMOTE OBJECTS

CROSS REFERENCE TO RELATED APPLICATIONS

The present application is a continuation of International Application No. PCT/SE00/02636, filed 21 Dec. 2000 and published in English pursuant to PCT Article 21(2), and which claims priority to Swedish Application No. 9904845-6, filed 29 Dec. 1999. Both applications are expressly incorporated herein by reference in their entireties.

BACKGROUND OF INVENTION

1. Technical Field

The invention(s) relate to a systems and methods for communication between at least one central station and at least one remote mobile or stationary object by means of transmitting and receiving means.

This system and method is especially suitable when provided for exchange of information, data and even software programs, as well as for voice communication between cars, trucks, boats or other vehicles on one hand, and at least one central station on the other hand. An example of such a central station would be a center or service station of a manufacturer, a headstation for guiding or operating the vehicles or for providing help in case of emergency and accident. Further, the system and method is suitable and provided for communication with facilities and plants in remote areas which are operated, controlled, observed and/or monitored from one or more of those central stations.

2. Background Information

U.S. Pat. No. 5,890,061, the European counterpart of which is EP 0789498, discloses a vehicular emergency message system for a mobile vehicle for communication with a response center. A cellular transceiver, such as a cellular telephone, has a restricted and an unrestricted operating mode. The restricted operating mode is selectable by a user to affect communication links that are permitted during normal operation, whereas the unrestricted operation mode is activated prior to initiating a request for assistance in case of emergency, thereby allowing a more reliable connection over a cellular telephone network.

Further vehicular emergency message systems for mobile vehicles are disclosed in U.S. Pat. Nos. 5,781,101, 5,687,215, 5,686,910 and 5,572,204, respectively. A user can request emergency or roadside assistance from a response center by activating a button in the vehicle. The global positioning system is used to continuously store the vehicle location. A cellular telephone network is used to contact a response center and transfer a data string via modem containing information to assist the response center in acting on the request. The various systems comprise additional means either for storing system information, for sending a termination tone to the vehicle upon satisfactory completion of the request, for initiating an automatic call-in to the response center if a predetermined time has elapsed since the last connection and for initiating a second call to a different telephone number if a first attempt to contact the response center has been unsuccessful.

SUMMARY OF INVENTION

It is an object of the invention to provide a system and method for communication between at least one remote object and at least one central station by means of transmitting and receiving means by which the reliability of communication is improved.

It is a further object of the invention to provide such a system and method for communication between at least one remote object and at least one central station by which detection of emergency situations is improved.

It is a further object of the invention to provide such a system and method for communication between at least one remote object and at least one central station which is able to initiate a remote diagnostic of the at least one object.

These and other objects are achieved by a system for communication between at least one central station and at least one remote mobile or stationary object by means of transmitting and receiving means. Exemplarily, the one object may include, or take the form of a cellular phone module which provides a private subscription for private usage by a driver or operator of the object, usually a vehicle. A selectable service subscription can be provided for transmitting and managing service like remote status information, malfunction, diagnostics and maintenance, as well as technical and emergency assistance by means of the at least one central station. Further advantages are found in the included claims which also form a part of the present disclosure.

BRIEF DESCRIPTION OF DRAWINGS

Further details, features and advantages become apparent from the following description of a preferred embodiment of the invention with reference to the drawings, in which.

DETAILED DESCRIPTION

Figure 1:
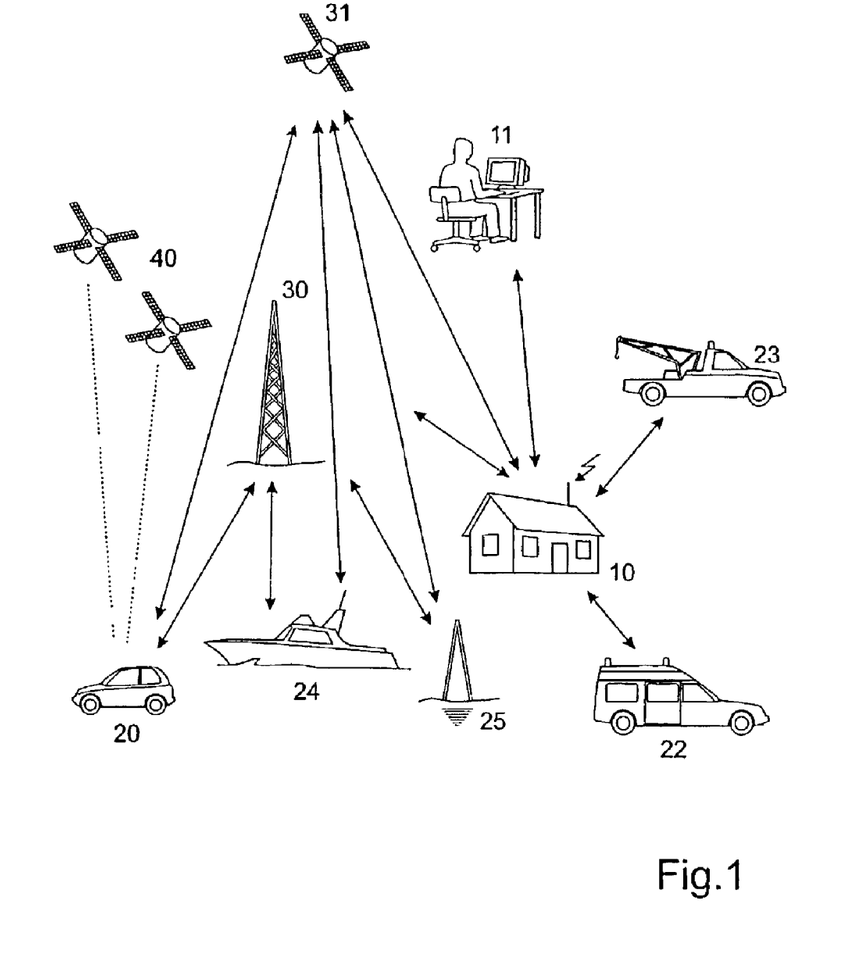
FIG. 1 is a general schematic view of various components of a system configured according to the present invention.

The major components of a preferred embodiment of the inventive system and its environment are shown in FIG. 1. It comprises a customer service center 10 with an operator 11. At least one vehicle 20, at least one boat or ship 24, as well as one or more stationary pieces of equipment 25 such as a remote facility or plant that communicates with the service center 10 via a cellular communication network 30 like GSM (European standard) or AMPS (US standard) and/or a satellite communication network 31, either of which is for exchanging information, data and voice communication in both directions. Further, even software programs can be transmitted if necessary. A position of the vehicle(s) 20 is detected by means of a global positioning system (GPS) 40. Emergency assistance vehicles 22 and roadside assistance vehicles 23 can communicate with the service center 10 in a similar manner or in any other way, and are activated by the service center in case of need by one of the remote objects and/or vehicles.

In general, the system provides telephone services and emergency and technical assistance using both cellular 30 and satellite communication 31. This allows for a reliable connection between the remote objects or facilities, vehicles and the customer service center 10 or some other response center.

More specifically, the customer service center 10 can automatically handle emergency situations, remote diagnostics, maintenance and commands to the mobile and stationary objects 20, 24, 25. Further, a vehicle driver or operator of the remote vehicle or facility can manually request help or signal an emergency to the customer service center. Additionally, the mobile and stationary objects can automatically inform the customer service center 10 in case of emergency, malfunction or for other prescribed reasons. All these exchanges of data, voice, information and software programs is conducted with a high reliability due to the use of both cellular 30 and satellite communication 31. The actual position of the object, be it stationary or mobile, can be detected and evaluated by the global positioning system 40.

Figure 2:
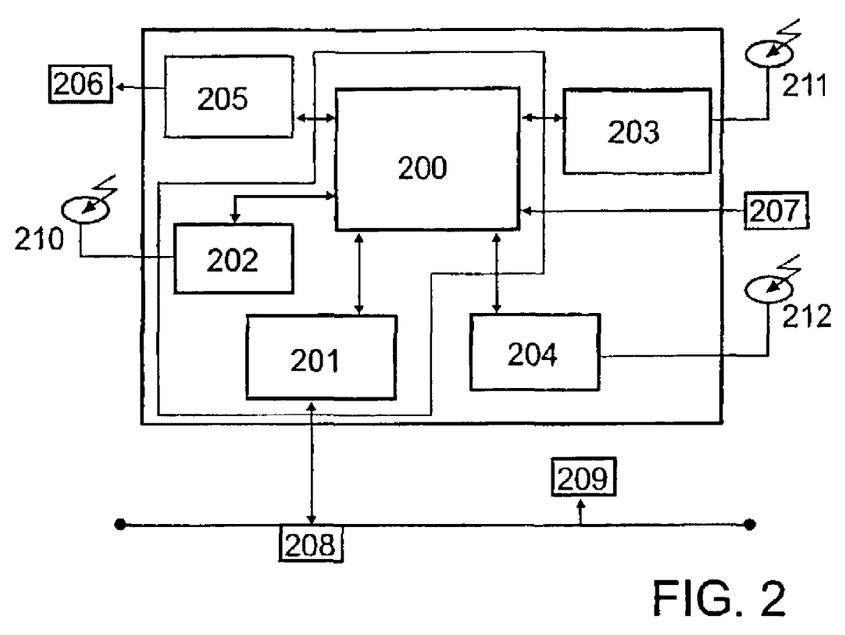
FIG. 2 shows a functional schematic of a first unit that can be exemplarily incorporated in a mobile object.

FIG. 2 shows a block diagram of a first unit of the system as incorporated in a mobile object like the exemplary vehicles or ship. It includes a controller module 200 for bi-directional communication with a data bus or network manager 201, a cellular phone module 202, a satellite communication module 203, a GPS controller 204 and a user interface manager 205 which is connected to a keypad 206 with incorporated loudspeaker and microphone for voice communication. Further, a backup battery (not illustrated) is provided for supplying these modules in case of main battery failure.

For transmitting and receiving signals, the phone module 202 is connected with a first antenna 210. A backup mobile phone antenna (not illustrated) is included in the phone module for usage in case of damage to the first antenna. The satellite communication module is connected with a second antenna 211 and the GPS-controller is connected with a third antenna 212. Further, at least one emergency sensor 207 is connected to the controller module 200 for automatically detecting accidents or malfunctions of the object.

The data bus or network manager 201 is connected to an internal data bus or network 208 of the object in order to retrieve information from, and send commands to several vehicle components like motor, brakes, alarm, audio and others. Data messages and phone information is displayed on a display 209.

The cellular phone module 202 provides a phone subscription for private usage or manual requests for assistance (voice- and data-transmission) by a driver or operator of the object, and a service subscription for connection to the customer service center (software program download, voice- and data-transmission) and for transmitting and managing several services like remote diagnostics, maintenance, emergency or accident assistance. The service subscription is embedded into the phone module 202. The customer service center 10 as well as the object 20, 24, 25 can request and initiate communication via the service subscription.

The services can further include a roadside assistance service, an emergency assistance service, services for transmitting of diagnostic reports like motor status and brake status or malfunction, and/or a service for object location, either periodically or on request of the customer service center or the object. The system further offers the possibility for a user at the customer service center to retrieve information from, or send command to any module in the vehicle connected to the internal data bus or network 208. These reports and information can be stored by the customer service center and used for vehicle maintenance and repair.

The transition from private subscription to service subscription can be initiated by a key press of the operator, if for example road or emergency assistance is needed. Further, an accident can automatically initiate the service subscription by means of at least one sensor which for example detects an air-bag deployment. Also, service subscription can be activated by an alarm in case of theft. The transition to private subscription is effected by a simple key press ("phone on").

A conflict concerning simultaneous execution of several such services is handled automatically by the system by assigning and affecting a priority to each service. Preferably, a sensed indication of an occurrence such as an accident via, for example, the detection of an air-bag deployment, is assigned an upper-most priority status. Exemplarily, if a driver asks for roadside assistance, the roadside assistance service of the system is activated. If subsequently the driver or a sensor signals an emergency, the roadside assistance service is deactivated and the emergency assistance service is activated. If then an accident occurs, the emergency assistance service is deactivated and an air-bag deployment notification is activated.

The driver can manually request help in any case. If he or she is lost, vehicle position is reported using GPS 40 and GPS controller 204, and navigation information is provided by voice or data communication from the customer service center. If the vehicle has broken down, remote vehicle diagnostic may be performed, vehicle position be reported using GPS and a breakdown mechanic and roadside assistance 23 be informed and deployed. It should be appreciated that these are only a few examples of possible manually initiated assistance that can be provided by the inventive system.

In case of an emergency being detected by the sensor 207, the vehicle status and position are reported automatically to the customer service center or a specific rescue service via the service subscription. A voice communication is also established to enable emergency assistance 22 to contact the driver. The inventive system handles priority between all these functions as disclosed above so that any on-going phone call or manually requested help function is automatically interrupted to manage emergency assistance.

The inventive system manages cellular communication via phone module 202 and satellite communication via satellite communication module 203. The satellite system is primarily used as a backup when no cellular network is currently available.

An important feature of the inventive system is its modularity and its capability for being customized according to the user's needs. The controller module 200, the data bus or network manager 201 and the phone module 202 are considered to be basic components. User interface manager 205, satellite communication module 203 and GPS controller 204 are considered to be optional components.

Figure 3:
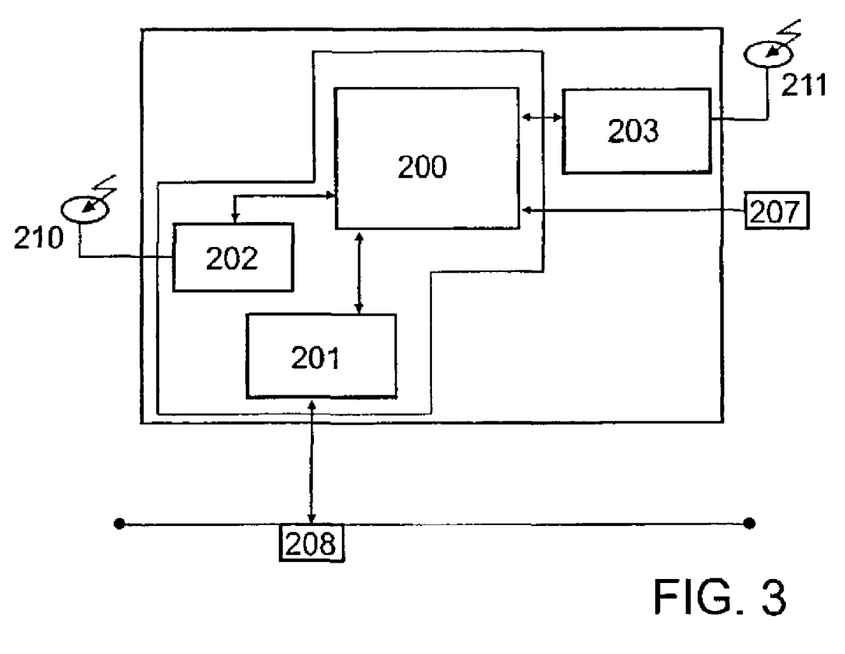
FIG. 3 shows a functional schematic of a second unit that can be exemplarily incorporated in a stationary object.

FIG. 3 shows a block diagram of a second unit of the system adapted to be incorporated in a stationary object like a remote facility or plant. It includes a controller module 200 which is connected to a data bus or network manager 201, a cellular phone module 202 with a first antenna 210 (and a backup antenna as mentioned above) and a satellite communication module 203 with a second antenna 211. The data bus or network manager 201 is connected to an internal data bus or network 208 of the object. Further, at least one emergency sensor 207 is connected to the controller module 200 for automatically detecting accidents or malfunctions of the object. Further, a backup battery (not illustrated) is provided for supplying these modules in case of main battery failure.

Possible applications concern any critical object in remote areas and which is accessible with difficulties. These are for example a water pump in a desert, an electricity generator in the mountains or a navigation beacon on an island.

The object can send an equipment diagnostic report periodically and offer the possibility for a remote user to retrieve information from or send commands to any module of the equipment connected to the internal data bus or network.

These reports and information can be stored by the customer service center and used for the equipment maintenance and repair.

In case of a major problem detected by sensor 207, the controller module 200 can automatically report the actual problem and equipment status.

Problem report, equipment status, information and commands are transferred using cellular or satellite communication data messages. Satellite is used as a backup when no cellular network is currently accessible; again, the cellular phone can handle the above disclosed two subscriptions.

Figure 4:
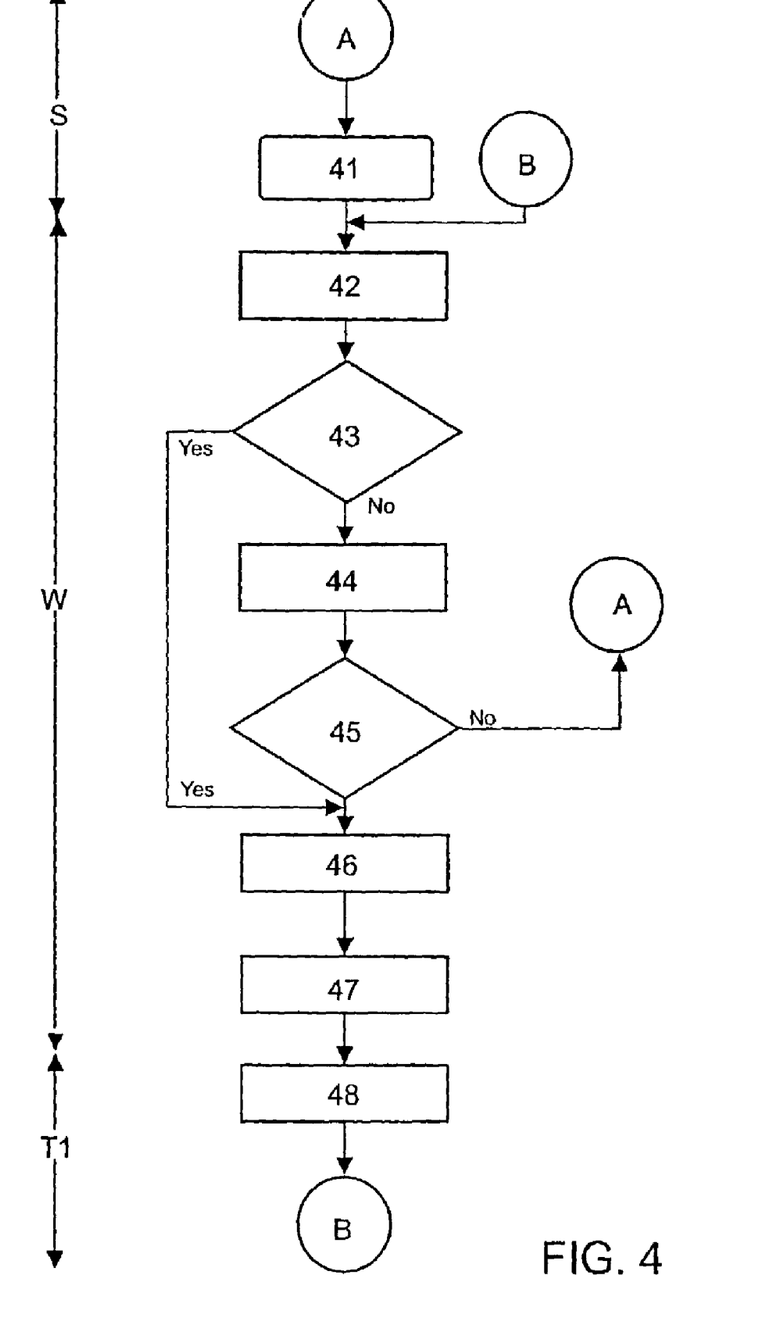
FIG. 4 is a flow chart indicating various steps in different operating modes according to methods of the present inventions.

Now, referring to FIG. 4, a flow chart indicating various steps in different operating modes of an object is shown. These modes are a sleep mode S, a standby mode W and a first service execution mode T1.

The sleep mode S ends when a wake up timer has elapsed in step 41. The wake up period is preferably programmable by the customer service center 10. The object enters standby mode W in step 42. It is powered up and initialized. The phone module 202 is activated and the service subscription is selected. The object waits for an incoming data message using cellular communication 30 in step 43 during a defined first period. If no message has been received after this first period according to step 43, satellite communication module 203 is activated in step 44. The object waits for an incoming message using satellite communication 31 in step 44 during a defined second period. Preferably, the first and second periods are programmable with respect to time and duration by the customer service center, so that these periods are synchronized with corresponding active periods in the customer service center 10 allowing a connection to be reliably established. If no message has been received after this second period according to step 45, the object returns to sleep mode S via point A where power consumption is minimal.

When a data message has been received according to step 43 or step 45, it is decoded in step 46. Each data message preferably has a standard format like, for example, Global Automotive Protocol for Telematics Standard (GATS). The data message must contain at least one service identifier (code) for selecting the requested service. The selected service is activated in step 47, and the related mode is executed in the object according to step 48. Service execution includes mainly information retrieved from internal data bus or network manager 201, message assembly and message sending using cellular phone module 202 or satellite communication module 203. It can also optionally include position computation using GPS 40 and voice connection with the customer service center 10. When the first service execution mode T1 is completed, the object returns to standby mode W via point B.

Figure 5:
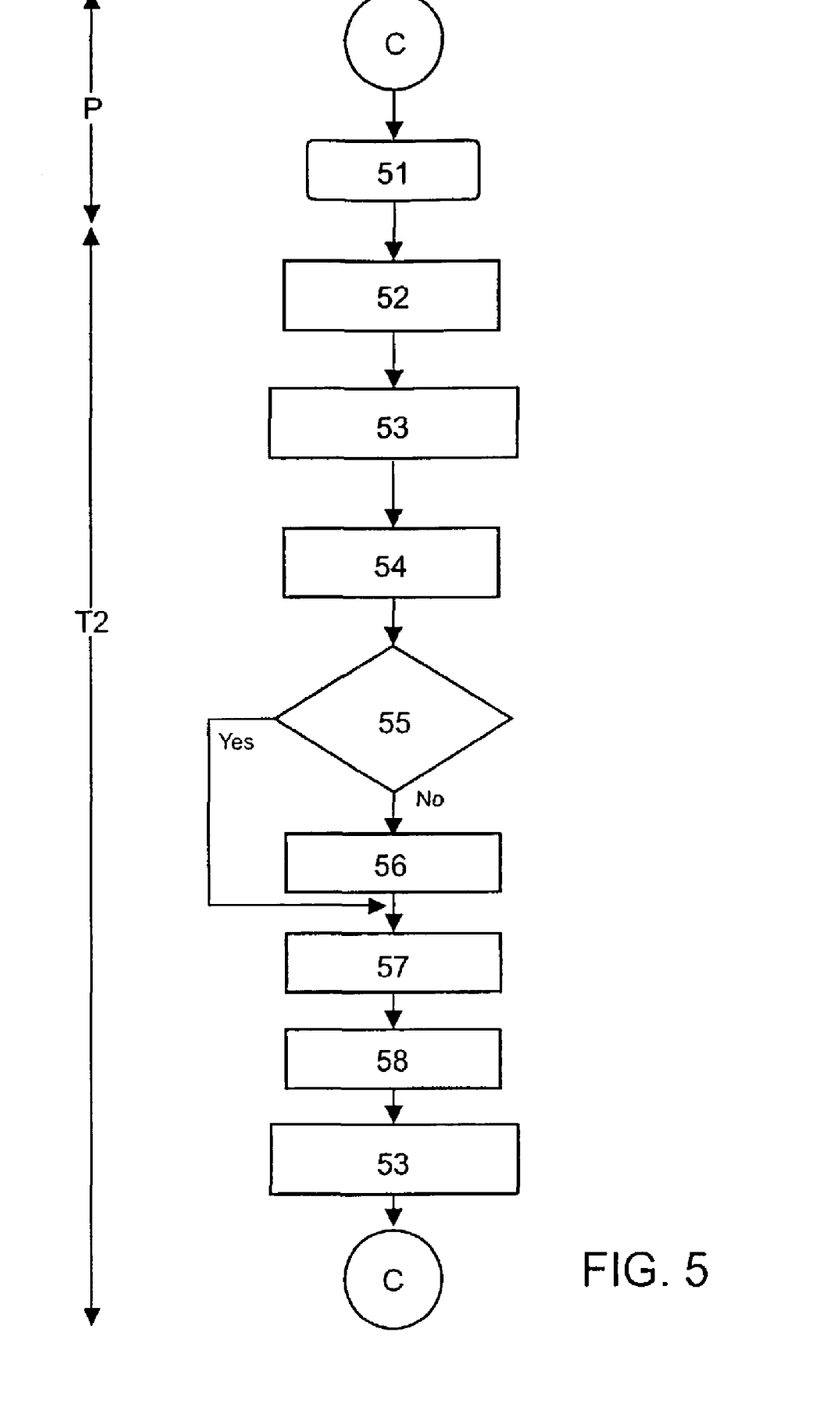
FIG. 5 is a flow chart indicating various steps in further operating modes of the inventions.

Referring to FIG. 5, a flow chart indicating various steps in which operating modes of an object are shown. These modes are a phone mode P and a second service execution mode T2.

The phone mode (private subscription) ends when the service subscription is activated in step 51. The service subscription can be activated manually by an operator of the object, preferably using buttons, preferably automatically by emergency sensors or by the customer service center 10. Ongoing communication using the cellular phone module 202 in private subscription is interrupted in step 52 and the service subscription is selected in step 53. Preferably a message is displayed on the screen 209 to inform the user that service subscription is now active. The object(s) 20-25 tries to connect to the customer service center 10 (or vice versa) using cellular phone module 202 in step 54. If cellular communication 30 is not possible according to step 55, satellite communication 31 is activated in step 56 by means of satellite communication module 203.

If communication has been established according to step 55 or step 56, the activated service is executed in step 57. Service execution mainly includes the retrieving of information from the internal data bus or network 208, message assembly, and message sending using established cellular phone or satellite communication 30, 31. It can also optionally include position computation using GPS 40 and voice connection with the customer service center 10. When service execution is completed, connection with customer service center 10 is terminated in step 58. The private phone subscription is activated again in step 59 and the second service execution mode T2 is terminated. The object returns to phone mode P via point C. Preferably a message is displayed on the screen 209 to inform the user that the cellular phone module 202 in private subscription is now active again.

There are several advantages enabled through the provision and implementation of the present invention(s). Those advantages include the use of one or more sensors 207 located for example in air-bag units, motor or brakes or elsewhere, emergency situations can automatically be detected and transmitted to the customer service center. Another is the provision of cellular phone and satellite communication, which can also be used simultaneously as a redundant communication link that can be established so that reliability of communication is substantially improved. The controller module 200 can perform remote diagnostics and maintenance via data bus or network manager 201 and internal data bus or network 208, for example vehicle tracking, motor status reporting, fuel level, alarm notification, and commands for door lock and unlock and motor stop, and display related information messages on the screen 209 and/or transmitting to the customer service center 10. These actions can be initiated either automatically by a sensor or program at the object or vehicle, or manually by a user at the object, or responsive to a request from the customer service center which yields direct access to the internal data bus or network 208 of the object. In another aspect, advantages are derived by providing a phone subscription for private usage (voice and messages) and a service subscription for emergency and technical assistance by which reliability is improved in the case of an emergency by interrupting and inactivating any private usage. The controller module 200 can perform priority management between the different services with emergency assistance preferably being assigned the highest priority. The modular architecture of the inventive system makes it applicable to both mobile vehicles, including small airplanes, and static equipment and facilities.

The invention claimed is:

1. A method for communication between at least one central station and at least one remote mobile or stationary object by means of transmitting and receiving means wherein said at least one object comprises a cellular phone module, which provides a private subscription for private usage by a driver or operator of the object and a selectable service subscription for transmitting and managing at least one service like remote status information, malfunction diagnostics and maintenance as well as technical and emergency assistance, by means of the at least one central station, and wherein the at least one object has implemented a sleep mode in which the power consumption is minimal, a standby mode in which the at least one object is powered up and waits for an incoming message comprising a service identifier from at least one central station via a cellular and/or satellite communication, and a first service execution mode for activating the identified service, wherein a conflict concerning simultaneous execution of several services during said selectable service subscription is handled automatically by assigning and affecting a priority to each service and deactivating any services with a minor priority than the service with a first priority, and wherein at least one object has implemented a phone mode and a second execution mode, wherein the phone mode is interrupted when a service is requested, and the second execution mode is activated, until a cellular and/or a satellite communication between at least one object and at least one central station has been established and the requested service has been executed.

2. The method according to claim 1, wherein the sleep mode is terminated and the standby mode is activated when a wake up timer elapsed.

3. The method according to claim 1, wherein the standby mode is activated for a predetermined period of time, after which the sleep mode is again activated if no message has been received, or the first service execution mode and a requested service is activated if a related message has been received and decoded.

4. A method for communication between at least one central station and at least one remote mobile or stationary object by means of transmitting and receiving means wherein said at least one object comprises a cellular phone module, which provides a private subscription for private usage by a driver or operator of the object and a selectable service subscription for transmitting and managing at least one service like remote status information, malfunction diagnostics and maintenance as well as technical and emergency assistance, by means of the at least one central station, and wherein the at least one object has implemented a sleep mode in which the power consumption is minimal, a standby mode in which the at least one object is powered up and waits for an incoming message comprising a service identifier from at least one central station via a cellular and/or satellite communication, and a first service execution mode for activating the identified service and wherein a conflict concerning simultaneous execution of several services during said selectable service subscription is handled automatically by assigning and affecting a priority to each service and deactivating any services with a minor priority than the service with a first priority, and wherein the service subscription or a transition from private subscription to service subscription is initiated periodically and/or upon request of at least one central station or of at least one object, and/or by a key press of the operator and/or automatically by means of at least one sensor for detecting accidents, emergency or malfunctions of at least one object or by means of a further sensor for detecting an air-bag deployment or by an alarm in case of a theft.

5. A communication object for communicating with at least one central station by means of transmitting and receiving means, the object comprising a cellular phone module for providing a private subscription for private usage by a driver or operator of the object and a selectable service subscription for transmitting and managing at least one service like remote status information, malfunction diagnostics and maintenance as well as technical and emergency assistance, by means of the at least one central station, wherein the object has implemented a sleep mode in which the power consumption is minimal, a standby mode in which the object is powered up and waits for an incoming message comprising a service identifier from at least one central station via a cellular and/or satellite communication, and a first service execution mode for activating the identified service, and further comprising means for automatically resolving conflict associated with simultaneous execution of several services during said selectable service subscription by assigning and affecting a priority to each service and deactivating any services with a minor priority than the service with a first priority, and which object has implemented a phone mode and a second execution mode, wherein the phone mode is interrupted when a service is requested, and the second execution mode is activated, until a cellular and/or a satellite communication between the object and at least one central station has been established and the requested service has been executed.

6. A communication object according to claim 5, wherein in the standby mode, the cellular phone module, in the standby mode, is activated and the service subscription is selected.

7. A communicating object according to claim 5, wherein the sleep mode is terminated and the standby mode is activated when a wake up timer elapses.

8. A communication object according to claim 5, wherein the standby mode is activated for a predetermined period of time, after which the sleep mode is again activated if no message has been received or the first service execution mode and a requested service is activated if a related message has been received and decoded.

9. A communication object according to claim 5, further comprising at least one of a user interface manager, a satellite communication module, a GPS controller and at least one emergency sensor for automatically detecting accidents, emergency or malfunctions of the object.

10. A communication object according to claim 5, further comprising a controller module for performing priority management between different services.

11. A communication object according to claim 5, wherein the object is a vehicle, a boat or ship, an airplane or stationary equipment like facility or plant.

12. A communication object according to claim 5, wherein a satellite communication is provided for activation if the cellular communication is not available.

13. A communication object for communicating with at least one central station by means of transmitting and receiving means, the object comprising a cellular phone module for providing a private subscription for private usage by a driver or operator of the object and a selectable service subscription for transmitting and managing at least one service like remote status information, malfunction diagnostics and maintenance as well as technical and emergency assistance, by means of the at least one central station, wherein the object has implemented a sleep mode in which the power consumption is minimal, a standby mode in which the object is powered up and waits for an incoming message comprising a service identifier from at least one central station via a cellular and/or satellite communication, and a first service execution mode for activating the identified service, and further comprising means for automatically resolving conflict associated with simultaneous execution of several services during said selectable service subscription by assigning and affecting a priority to each service and deactivating any services with a minor priority than the service with a first priority, and wherein the service subscription or a transition from private subscription to service subscription is initiated periodically and/or upon request of at least one central station or of at least one object, and/or by a key press of the operator and/or automatically by means of at least one sensor for detecting accidents, emergency or malfunctions of at least one object or by means of a further sensor for detecting an air-bag deployment or by an alarm in case of a theft.

14. A system comprising at least one central station, at least one remote mobile or stationary object and transmitting and receiving means for communication between the at least one central station and the at least one remote mobile or stationary object, wherein the at least one remote mobile or stationary object comprises a cellular phone module, which provides a private subscription for private usage by a driver or operator of the object and a selectable service subscription for transmitting and managing at least one service like remote status information, malfunction diagnostics and maintenance as well as technical and emergency assistance, by means of at least one central station, and wherein the at least one remote mobile or stationary object has implemented a sleep mode in which the power consumption is minimal, a standby mode in which the at least one remote mobile or stationary object is powered up and waits for an incoming message comprising a service identifier from at least one central station via a cellular and/or satellite communication, and a first service execution mode for activating the identified service, and further comprising means for automatically resolving conflict associated with simultaneous execution of several services during said selectable service subscription by assigning and affecting a priority to each service and deactivating any services with a minor priority than the service with a first priority, and wherein at least one object has implemented a phone mode and a second execution mode, wherein the phone mode is interrupted when a service is requested, and the second execution mode is activated, until a cellular and/or a satellite communication between at least one object and at least one central station has been established and the requested service has been executed.

15. A system according to claim 14, wherein said central station is configured to activate the service subscription.

16. A system according to claim 14, wherein the satellite communication (31) is provided for activation if the cellular communication (30) is not available.

17. A system comprising at least one central station, at least one remote mobile or stationary object and transmitting and receiving means for communication between the at least one central station and the at least one remote mobile or stationary object, wherein the at least one remote mobile or stationary object comprises a cellular phone module, which provides a private subscription for private usage by a driver or operator of the object and a selectable service subscription for transmitting and managing at least one service like remote status information, malfunction diagnostics and maintenance as well as technical and emergency assistance, by means of at least one central station, and wherein the at least one remote mobile or stationary object has implemented a sleep mode in which the power consumption is minimal, a standby mode in which the at least one remote mobile or stationary object is powered up and waits for an incoming message comprising a service identifier from at least one central station via a cellular and/or satellite communication, and a first service execution mode for activating the identified service, and further comprising means for automatically resolving conflict associated with simultaneous execution of several services during said selectable service subscription by assigning and affecting a priority to each service and deactivating any services with a minor priority than the service with a first priority, and wherein the service subscription or a transition from private subscription to service subscription is initiated periodically and/or upon request of at least one central station or of at least one object, and/or by a key press of the operator and/or automatically by means of at least one sensor for detecting accidents, emergency or malfunctions of at least one object or by means of a further sensor for detecting an air-bag deployment or by an alarm in case of a theft.

\* \* \* \* \*